United States Patent [19]
Tischer

[11] 4,244,630
[45] Jan. 13, 1981

[54] JOURNAL MOUNTING FOR THE SHAFT OF A WATER PUMP OR THE LIKE

[75] Inventor: Roland Tischer, Dittelbrunn, Fed. Rep. of Germany

[73] Assignee: Fag Kugelfischer Georg Schäfer & Co., Schweinfurt, Fed. Rep. of Germany

[21] Appl. No.: 76,360

[22] Filed: Sep. 17, 1979

[30] Foreign Application Priority Data

Sep. 19, 1978 [DE] Fed. Rep. of Germany ....... 2840666

[51] Int. Cl.³ ............................................. F16C 35/06
[52] U.S. Cl. ............................ 308/189 R; 308/207 R; 308/245
[58] Field of Search ............... 308/189 R, 207 R, 177, 308/DIG. 11, 237 R, 188, 195, 245

[56] References Cited

U.S. PATENT DOCUMENTS

| | | | |
|---|---|---|---|
| 3,796,510 | 3/1974 | Korrenn et al. | 308/207 R |
| 4,010,986 | 3/1977 | Otto | 308/189 R |
| 4,138,168 | 2/1979 | Herlitzek | 308/DIG. 11 |

*Primary Examiner*—Lenard A. Footland
*Attorney, Agent, or Firm*—Karl F. Ross

[57] ABSTRACT

A pump shaft is journaled in a housing through the intermediary of two metal rings forming the outer races of a ball bearing and a roller bearing whose rotary bodies are in direct contact with the shaft. The two bearing rings, which are relatively axially shiftable during assembly, are interconnected by a sleeve preferably of synthetic resin which they engage with a snap fit. The outer diameter of the sleeve is less than that of either ring; the two outer ring diameters may also differ in size from each other.

6 Claims, 1 Drawing Figure

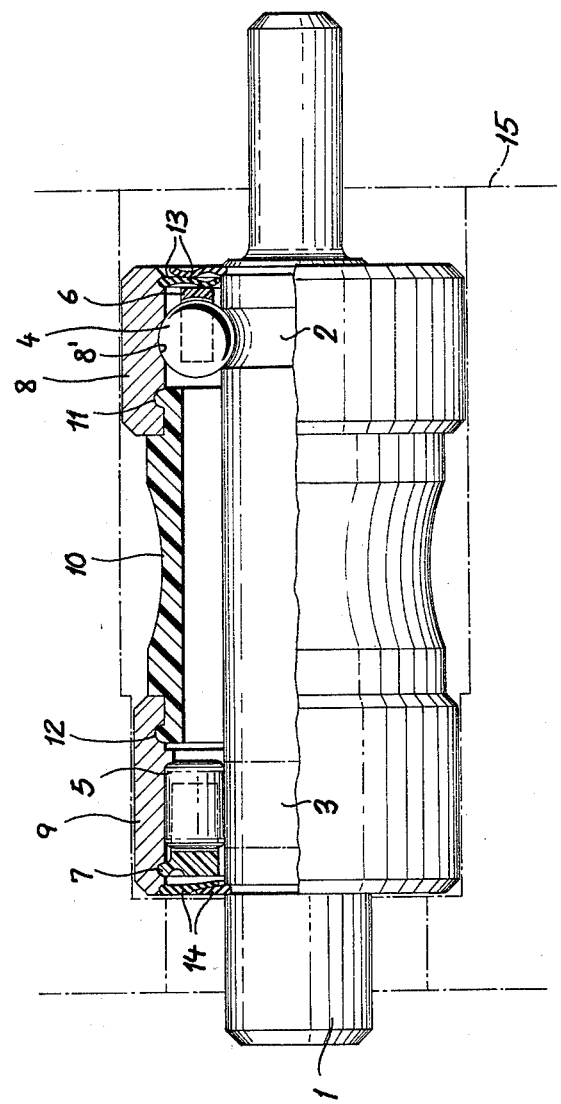

JOURNAL MOUNTING FOR THE SHAFT OF A WATER PUMP OR THE LIKE

FIELD OF THE INVENTION

My present invention relates to a journal mounting for a shaft, e.g. that of a water pump for an automotive vehicle or the like, which is rotatably mounted in a housing through the intermediary of a pair of axially spaced bearings.

BACKGROUND OF THE INVENTION

In commonly owned U.S. Pat. No. 3,796,510 there has been disclosed a shaft mounting of this type in which the two bearing comprise sets of frustoconical roller bodies in contact with oppositely beveled peripheral zones of a surrounding bushing acting as an outer race therefor, the bushing being closely fitted into a cylindrical housing part. The bushing, for this purpose, must be carefully machined over its entire outer surface. The shaft, furthermore, must be provided with shoulder-forming enlargements preventing an axial shifting of the roller bearings.

When balls are used instead of rollers as rotary bearing bodies, grooved tracks in the shaft and in the surrounding outer race will keep these elements axially aligned. In that case, however, problems of assembly arise particularly where there are two ball bearings at opposite ends of a sleeve surrounding the shaft. German patent application No. 2,113,905 published Oct. 14, 1971, for example, shows a shaft mounting of this type in which an intermediate bushing of elastomeric material, disposed between the two bearings within their common sleeve to act as a lubricant distributor, has a tapered outer surface designed to enable a relative tilting of the sleeve and the shaft for the purpose of facilitating the introduction of the balls into their respective grooves.

OBJECT OF THE INVENTION

The object of my present invention is to provide a shaft mounting of the aforedescribed character which is of simple construction and easy to assemble.

SUMMARY OF THE INVENTION

I realize this object, in accordance with my present invention, by providing two axially spaced bearing rings concentrically surrounding the associated shaft, two sets of rotary bodies inserted between these bearing rings and respective peripheral shaft zones spacedly surrounded thereby, and a sleeve between the rings having extremities snap-fitted to the latter. The rotary bodies of at least one set, advantageously designed as balls, are partly received in an inner annular groove of the respective bearing ring and in a confronting annular groove at the corresponding peripheral shaft zone; the rotary bodies of the other set preferably are cylindrical rollers.

As long as the combined depth of the two confronting grooves is substantially less than the ball radius, the bearing balls can be readily inserted with the ring eccentrically positioned on the shaft, this operation being followed by a peripheral redistribution of the balls in the clearance between the shaft and the ring while the latter is being centered on the shaft axis; the balls are then preferably held separated by an axially introduced cage as is well known per se. Even a single set of balls thus emplaced will prevent axial shifting of the bearing assembly on the shaft, thanks to the interengagement of the two rings and the interposed sleeve. Axial interfitting of the rings and the sleeve is facilitated if the other set of rotary bodies is in the form of cylindrical rollers.

BRIEF DESCRIPTION OF THE DRAWING

The above and other features of my invention will now be described in detail with reference to the accompanying drawing the sole FIGURE of which shows, in elevation and partly in axial section, a shaft mounting embodying the present improvement.

SPECIFIC DESCRIPTION

In the drawing I have shown a horizontal shaft 1, which may be that of a vehicular water pump, rotatably received in a surrounding housing 15 illustrated only in phantom lines. Shaft 1 has an annular groove 2 accommodating a set of bearing balls 4 which are partly received in that groove and in a confronting groove 8' on the inner peripheral surface of a surrounding metallic ring 8 forming an outer bearing race. Another metallic ring 9 surrounds an annular zone 3 of shaft 1, axially spaced from groove 2, and forms the outer race for a set of cylindrical rollers 5. Balls 4 and rollers 5 are held peripherally spaced apart by conventional cages 6 and 7, preferably of synthetic resin; the annular clearances accommodating the rotary bodies 4 and 5 are closed against the outside by flexible sealing rings 13, 14 as known per se from commonly owned U.S. Pat. No. 3,796,510 referred to above. These sealing rings retain the lubricant provided by the manufacturer so that the user need not add any.

An intermediate sleeve 10 of elastomeric material, flanked by bearing rings 8 and 9, has extremities provided with annular bulges that are snap-fitted into inner peripheral grooves 11, 12 of these rings so as to form therewith a unit retained in a predetermined axial position relative to shaft 1 by the balls 4 engaging in grooves 2, 8'. The outer diameter of sleeve 10 is less than that of either ring 8, 9; the diameter of ring 8 is shown to exceed that of ring 9 whereby the assembly of shaft 1, rotary bodies 4, 5 and unit 8-10 can be readily introduced, with its narrower (left-hand) end first, into the broader (right-hand) end of the internally stepped housing 15. Only in the final insertion phase will the two bearing rings be press-fitted into the corresponding housing portions.

As will be readily apparent, the shaft mounting shown in the drawing is easily assembled by first placing the ring 8 around shaft 1, inserting the balls 4 and their cage 6 as described above, snap-fitting the sleeve 10 to ring 8, and sliding the ring 9 with rollers 5 and cage 7 over the shaft 1 from the opposite (left-hand) end thereof until ring 9 and sleeve 10 also interengage.

I claim:

1. A journal mounting for a shaft rotatable inside a housing, comprising:
    a first and a second bearing ring axially spaced from each other, said bearing rings concentrically surrounding said shaft and being separated by annular clearances from respective peripheral zones thereof;
    a first set of rotary bodies partly received in an inner annular groove of said first bearing ring in a confronting annular groove of said shaft at one of said peripheral zones;

a second set of rotary bodies inserted between said second bearing ring and said shaft in contact with the other of said peripheral zones; and a sleeve between said bearing rings having extremities snap-fitted onto same.

2. A journal mounting as defined in claim 1 wherein said bearing rings are metallic and said sleeve consists of elastomeric material.

3. A journal mounting as defined in claim 1 or 2 wherein said sleeve has an outer diameter smaller than the outer diameters of both said bearing rings.

4. A journal mounting as defined in claim 3 wherein said bearing rings have different outer diameters.

5. A journal mounting as defined in claim 1 or 2 wherein said first set of rotary bodies are balls.

6. A journal mounting as defined in claim 5 wherein said second set of rotary bodies are cylindrical rollers.

* * * * *